US011578232B2

(12) United States Patent
Yamaguchi et al.

(10) Patent No.: US 11,578,232 B2
(45) Date of Patent: Feb. 14, 2023

(54) SUPER-LIQUID-REPELLENT COATING FILM AND CURABLE COMPOSITION FOR FORMING SUPER-LIQUID-REPELLENT COATING FILM

(71) Applicant: DAIKIN INDUSTRIES, LTD., Osaka (JP)

(72) Inventors: Hiroki Yamaguchi, Osaka (JP); Kakeru Hanabusa, Osaka (JP); Kensuke Mohara, Osaka (JP); Masamichi Morita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1080 days.

(21) Appl. No.: 16/092,228

(22) PCT Filed: Apr. 13, 2017

(86) PCT No.: PCT/JP2017/015204
§ 371 (c)(1),
(2) Date: Oct. 9, 2018

(87) PCT Pub. No.: WO2017/179678
PCT Pub. Date: Oct. 19, 2017

(65) Prior Publication Data
US 2020/0347258 A1     Nov. 5, 2020

(30) Foreign Application Priority Data
Apr. 13, 2016   (JP) .............................. JP2016-080663

(51) Int. Cl.
| | |
|---|---|
| *C09D 133/16* | (2006.01) |
| *C09D 5/16* | (2006.01) |
| *C09D 7/20* | (2018.01) |
| *C09D 7/62* | (2018.01) |
| *C08K 3/36* | (2006.01) |
| *C08K 9/06* | (2006.01) |
| *C09C 1/30* | (2006.01) |
| *C09D 7/40* | (2018.01) |
| *C09D 201/04* | (2006.01) |
| *C09D 201/00* | (2006.01) |
| *C09K 3/18* | (2006.01) |

(52) U.S. Cl.
CPC ......... *C09D 133/16* (2013.01); *C09D 5/1681* (2013.01); *C09D 7/20* (2018.01); *C09D 7/62* (2018.01)

(58) Field of Classification Search
None
See application file for complete search history.

(56) References Cited

U.S. PATENT DOCUMENTS

| | | | |
|---|---|---|---|
| 2009/0018249 A1* | 1/2009 | Kanagasabapathy .... | C09D 1/00 524/493 |
| 2015/0247079 A1 | 9/2015 | Nishikawa et al. | |
| 2016/0077239 A1 | 3/2016 | Asahi et al. | |

FOREIGN PATENT DOCUMENTS

| | | |
|---|---|---|
| JP | 8-211202 | 8/1996 |
| JP | 2001-131318 | 5/2001 |
| JP | 2005-281370 | 10/2005 |
| JP | 2008-169364 | 7/2008 |
| JP | 2010-89373 | 4/2010 |
| JP | 2016-71133 | 5/2016 |
| WO | 2014/057712 | 4/2014 |
| WO | 2016/056663 | 4/2016 |

OTHER PUBLICATIONS

Extended European Search Report dated Nov. 25, 2019 in corresponding European Patent Application No. 17782491.9.
International Search Report dated Jul. 4, 2017 in International (PCT) Application No. PCT/JP2017/015204.
Cho et al., "Transparent Superhydrophobic/Translucent Superamphiphobic Coatings Based on Silica-Fluoropolymer Hybrid Nanoparticles", Langmuir, vol. 29, No. 48, 2013, pp. 15051-15057.

* cited by examiner

*Primary Examiner* — Ramsey Zacharia
(74) *Attorney, Agent, or Firm* — Wenderoth, Lind & Ponack, L.L.P.

(57) ABSTRACT

The present invention addresses the problem of providing a super-liquid-repellent coating film that has improved abrasion resistance. Provided as a means for solving the problem is a coating film that has a fluorine atom content of 1 to 60 wt %, the coating film having a surface that has an average surface roughness Ra of 0.5 to 20, a surface area ratio of 1.7 to 5, a contact angle with water of 150° or more, a contact angle with n-hexadecane of 80° or more, and a surface that has a contact angle with water of 150° or more after being rubbed 100 times with a PET film under a load of 100 g.

3 Claims, No Drawings

SUPER-LIQUID-REPELLENT COATING FILM AND CURABLE COMPOSITION FOR FORMING SUPER-LIQUID-REPELLENT COATING FILM

TECHNICAL FIELD

The present invention relates to a coating film, in particular, a super-liquid-repellent coating film that can impart super water repellency and super oil repellency (hereinafter sometimes collectively referred to as "super liquid repellency") to a surface, and also relates to a curable composition for forming a coating film that can form a super-liquid-repellant coating film.

BACKGROUND ART

Various super-liquid-repellent coating films have been proposed.

For example, there has been proposed a method for imparting super liquid repellency by chemically bonding a fluoroalkylsilane compound to a surface to be treated, the surface having formed thereon a cured coating film comprising silica particles etc. (Patent Literature (PTL) 1).

A method for forming a coating film by hydrolyzing alkoxysilane while the alkoxysilane, perfluoroalkylsilane, and silica particles are in a mixed state has also been proposed (PTL 2).

Further, a coating film obtained by copolymerizing particles having a radically polymerizable group on the surface and a fluorine-containing monomer has also been proposed (Non-patent Literature (NPL) 1).

CITATION LIST

Patent Literature

PTL 1: JP2001-131318A
PTL 2: JP2010-89373A

Non-Patent Literature

NPL 1: Cho et al., "Transparent superhydrophobic/translucent superamphiphobic coatings based on silica-fluoropolymer hybrid nanoparticles," Langmuir, 2013, 29 (48), pp. 15051-15057

SUMMARY OF INVENTION

Technical Problem

The present inventors found that conventional super-liquid-repellent coating films fail to have sufficient abrasion resistance. An object of the present invention is to solve this new problem. In particular, the present invention aims to provide a super-liquid-repellent coating film that has both super-liquid-repellency, which is one of its inherent properties, and abrasion resistance.

Solution to Problem

The present inventors carried out extensive research and found that the above object can be achieved by using a coating film that has a fluorine atom content of 1 to 60 wt %, an average surface roughness Ra of 0.5 to 20 μm, a specific surface area ratio of 1.7 to 5, a contact angle with water of 150° or more, and a contact angle with n-hexadecane of 80° or more, and that has a surface that has a contact angle with water of 150° or more after being rubbed 100 times with a PET film under a load of 100 g/cm$^2$. The present invention was accomplished as a result of further repeated trial and error, and includes the following embodiments.

Item 1. A coating film having a fluorine atom content of 1 to 60 wt %,
the coating film having a surface that has:
an average surface roughness Ra of 0.5 to 20 μm,
a specific surface area ratio of 1.7 to 5,
a contact angle with water of 150° or more,
a contact angle with n-hexadecane of 80° or more, and
a contact angle with water of 150° or more after being rubbed 100 times with a PET film under a load of 100 g/cm$^2$.

Item 2. A curable composition for forming a coating film, the composition comprising a fluorine compound,
the coating film after curing having a surface that has:
an average surface roughness Ra of 0.5 to 20 μm,
a specific surface area ratio of 1.7 to 5,
a contact angle with water of 150° or more,
a contact angle with n-hexadecane of 80° or more, and
a contact angle with water of 150° or more after being rubbed 100 times with a PET film under a load of 100 g/cm$^2$.

Item 3. The curable composition for forming a coating film according to Item 2, further comprising a fluorine-based solvent.

Advantageous Effects of Invention

According to the present invention, a coating film with excellent liquid repellency and abrasion resistance can be provided. Conventional super-liquid-repellent coating films were inapplicable to the surface of articles requiring abrasion resistance. By using the present invention, the range of application of super-liquid-repellent coating films can be extended to articles requiring abrasion resistance.

DESCRIPTION OF EMBODIMENTS

1. Coating Film

The coating film of the present invention has a fluorine atom content of 1 to 60 wt %, and has a surface that has an average surface roughness Ra of 0.5 to 20 μm, a specific surface area ratio of 1.7 to 5, a contact angle with water of 150° or more, a contact angle with n-hexadecane of 80° or more, and a contact angle with water of 150° or more after being rubbed 100 times with a PET film under a load of 100 g/cm$^2$.

The coating film of the present invention has a fluorine atom content of 1 to 60 wt %, more preferably 1.5 to 55 wt %, and even more preferably 2 to 50 wt %, based on the entire coating film.

Examples of the method for analysis of fluorine atoms in the coating film include a method of evaluation performed by partially peeling the coating film and a method of analysis performed while the coating film state is maintained. One of these methods is appropriately selected according to the state of the coating film etc.

As the method for analysis of fluorine atoms in the coating film, analysis using an automatic quick furnace can be performed when the fluorine atom content of the coating film is relatively high (10 wt % or more as a rule of thumb). The automatic quick furnace that is used may be, for example, an AQF-100 produced by Mitsubishi Chemical Corporation, or an equivalent. When the fluorine atom content of the coating film is relatively small (less than 10 wt % as a rule of thumb), analysis can be performed by burning the sample using a flask and conducting evaluation using an ion meter.

Examples of the method of analysis performed while the coating film state is maintained include X-ray photoelectron spectroscopy, energy-dispersive X-ray fluorescence analysis using a scanning electron microscope, and the like. One of such methods is appropriately selected according to the state of the coating film etc.

The coating film of the present invention has higher liquid repellency and abrasion resistance presumably because the coating film contains a fluorine compound and has a fluorine atom content within the range described above.

In the above, examples of the fluorine compound include compounds having constituent units based on, for example, fluoroalkyl (meth)acrylate wherein the fluoroalkyl group has 1 to 8 carbon atoms, triacryloyl heptadecafluorononenylpentaerythritol, 1,2-diacryloxymethyl-perfluorocyclohexane, and OPTOOL DAC-HP.

In the above, preferable examples of the fluorine compound are compounds having constituent units based on fluoroalkyl (meth)acrylates wherein the fluoroalkyl group has 1 to 6 carbon atoms, triacryloyl heptadecafluoronenylpentaerythritol, and 1,2-diacryloxymethyl-perfluorocyclohexane. More preferable examples of the fluodine compound are compounds having constituent units based on perfluorohexylmethyl (meth)acrylate, and triacryloyl heptadecafluorononenylpentaerythritol.

The surface of the coating film of the present invention has an average surface roughness Ra of 0.5 to 20 µm, more preferably 0.6 to 17.5 µm, and even more preferably 0.7 to 15 µm.

The coating film of the present invention has higher liquid repellency and abrasion resistance presumably because the surface of the coating film of the present invention has an average surface roughness Ra within the range described above.

In the present invention, the average surface roughness Ra of the coating film surface refers to the average of the average surface roughness Ra measured at five points randomly selected in the length direction (702.801 µm) of a quadrangular area of 526.929 µm×702.801 µm. Specifically, the measurement is performed by using a VK-9710 produced by Keyence Corporation, or an equivalent, and an MUL00201 microscope produced by Nikon Corporation, which is included with the VK-9710, or an equivalent.

The surface of the coating film of the present invention has a specific surface area ratio of 1.7 to 5, preferably 1.75 to 4.5, and more preferably 1.8 to 4.

The coating film of the present invention has higher liquid repellency and abrasion resistance presumably because the surface of the coating film has a specific surface area ratio within the range described above.

In the present invention, the specific surface area ratio of the coating film surface refers to the ratio of the surface area of the measured surface to the surface area of a truly smooth surface, which is calculated by comparing each surface area in a quadrangular area of 351.4 µm×351.4 µm. Specifically, the measurement is performed by using a VK-9710 produced by Keyence Corporation, or an equivalent, and an MUL00201 microscope produced by Nikon Corporation, which is included with the VK-9710, or an equivalent.

The coating film of the present invention has super liquid repellency. Although this is not limitative, in a preferred embodiment, the coating film when formed has a static contact angle with water of 150° or more, and a static contact angle with n-hexadecane (hereinafter sometimes referred to as "n-HD") of 80° or more. In the present invention, the static contact angle with water and the static contact angle with n-HD are measured in the following manner. Using a Drop Master 701 contact angle meter, or an equivalent, as a device and setting the volume of water of and n-HD added dropwise each to 2 µl, the measurement was performed at 5 points per sample. When the static contact angle is 150° or more, the liquid may be unable to stand alone on the surface of a base material under some conditions. Therefore, in such a case, the static contact angle is measured by using the needle of a syringe as a support, and the value thus obtained is used as a static contact angle.

The coating film of the present invention has a static contact angle with water of 150° or more after being rubbed 100 times with a PET film (trade name: U-46, produced by Toray Industries, Inc.), or an equivalent, under a load of 100 g/cm$^2$. Specifically, this parameter is measured in the following manner. A PET film (trade name: U-46, produced by Toray Industries, Inc., or an equivalent) is attached to the holder of a rubbing tester (a rubbing tester produced by Imoto Machinery Co., Ltd., "Abrasion resistance tester 151E, triple series," or an equivalent) (area in contact with a test sample: 1 cm$^2$) and the surface of the test sample is wiped by rubbing 100 times with the PET film under a load of 100 g. The contact angle with water is then measured. Preferably, the surface of the coating film after the rubbing has a static contact angle with water of 150° or more, and a static contact angle with n-hexadecane of 60° or more. More preferably, the surface of the coating film after the rubbing has a static contact angle with water of 150° or more, and a static contact angle with n-hexadecane of 80° or more.

The coating film of the present invention is preferably used to impart water repellency and/or oil repellency to a surface to be treated.

2. Composition for Forming Curable Coating Film

The curable composition for forming a coating film of the present invention is not particularly limited as long as the composition comprises a fluorine compound and the coating film after curing has the properties described above.

The curable composition for forming a coating film of the present invention may comprise, as a fluorine compound, the following fine particles (A) and/or polyfunctional crosslinkable compound (B).

2.1 Fine Particles (A) Having at Least One Fluorine-Containing Modified Compound Bound to the Surface The fine particles are not particularly limited. For example, a wide variety of inorganic fine particles, such as silica fine particles and metal oxide fine particles, and a wide variety of organic fine particles, such as carbon black, fullerene, and carbon nanotubes, can be used.

The size of the fine particles is such that the mean particle size of the primary dispersion as defined in DIN 53206 is preferably 0.5 nm to 1000 nm, more preferably 1 nm to 100 nm, and still more preferably 5 nm to 70 nm. When the size of the fine particles is within this range, the surface roughness necessary for imparting super liquid repellency to a surface to be treated tends to be easily obtained. The ratio of the roughness of the surface formed of fine particles with a mean particle size of 0.5 nm or more to the roughness of a smooth surface is expected to be high. On the other hand, the surface formed of fine particles with a mean particle size of 1000 nm or less is unlikely to have a roughness as high as what is called a "surface configuration," as compared with the diameter of droplets.

The measurement of the mean particle size of the fine particles in the primary dispersion can be performed by using a transmission electron microscope or a scanning electron microscope. More specifically, the mean particle size can be obtained by taking a photograph with a transmission electron microscope or a scanning electron microscope, measuring the diameter of 200 particles or more on the photograph, and calculating the arithmetic mean value. Not only the mean particle size of the used particles in the primary dispersion but also higher-order aggregates, such as secondary aggregates, as defined in DIN 53206 may affect liquid repellency. The presence of such higher-order aggregates in a certain proportion facilitates the formation of a quasi-fractal state; therefore, the surface roughness is increased to thereby enhance liquid repellency. In a dry-powder state, the proportion of higher-order aggregates is shown in apparent density. "Apparent density" here refers to the density obtained by measuring the volume of 0.2 g of a powder placed in a 10-ml graduated cylinder and calculating the density. This apparent density is preferably 0.01 to 0.5 g/cm$^3$, more preferably 0.015 to 0.3 g/cm$^3$, and even more preferably 0.02 to 0.05 g/cm$^3$.

In the fine particles having at least one modified compound bound to the surface, a polymerizable group is present at at least one molecular end of at least one of the modified compounds, and at least one of the modified compounds is a fluorine-containing compound.

The polymerizable group is present in a polymerizable state at at least one molecular end of the modified compound.

The polymerizable group is not particularly limited. Examples of polymerizable groups include radically polymerizable groups, cationic polymerizable groups, anionic polymerizable groups, and the like. In particular, radically polymerizable groups are preferable in view of versatility and reactivity.

The radically polymerizable group is not particularly limited. Examples include vinyl, (meth)acryl, styryl, maleimide, and like groups.

As the radically polymerizable group, for example, (meth)acryl and styryl groups are preferable from the viewpoint of versatility and reactivity.

The mode in which the modified compound(s) is/are bound to the surface of fine particles is not particularly limited. Examples include covalent bonds, coordinate bonds, ionic bonds, hydrogen bonds, bonds by Van der Waals force, and the like.

The method for producing fine particles having one or more modified compounds bound to the surface (A) is not particularly limited. In general, for example, a method comprising allowing a polymerizable group and a compound having a site reactive with the particle surface to react with the fine particles can be used. The site reactive with the particle surface can be suitably selected according to the state of the fine particle surface. The reaction is generally performed using silane coupling. When a compound is chemically bound to fine particles, selecting the number of compounds to be reacted is difficult. In general, after the reaction, multiple compounds are present on the surface of the fine particles in a chemically bound state.

The coating film of the present invention can be obtained by subjecting at least one of the above fine particles (A) to a polymerization reaction described below.

At least one of the modified compounds is a fluorine-containing compound and preferably has a fluoroalkyl group. "Fluoroalkyl group" as used here refers to an alkyl group wherein at least one hydrogen atom is substituted with a fluorine atom. The fluoroalkyl group includes a fluoropolyether group unless otherwise specified. The coating film of the present invention can exhibit excellent liquid repellency because at least one of the modified compounds is a fluorine-containing compound. High liquid repellency is provided presumably due to the presence of fluorine atoms on the surface of the fine particles. In the above, the fluoroalkyl group is preferably a perfluoroalkyl group in view of liquid repellency.

The fine particles (A) can be used singly or as a mixture of two or more.

The proportion of the fine particles (A) in the curable composition for forming a coating film of the present invention is not particularly limited. In general, the proportion is preferably about 1 to 15 wt. %, and more preferably about 2 to 10 wt. %.

2.2 Polyfunctional Crosslinkable Compound (B)

The curable composition for forming a coating film of the present invention imparts excellent abrasion resistance to the coating film after curing, presumably because the composition comprises a compound having 2 or more crosslinkable groups in the molecule (a polyfunctional crosslinkable compound).

The polyfunctional crosslinkable compound is not particularly limited. In view of abrasion resistance, the polyfunctional crosslinkable compound is preferably a compound having 2 to 8 crosslinkable groups in the molecule, more preferably a compound having 3 to 6 crosslinkable groups in the molecule, and even more preferably a compound having 3 crosslinkable groups in the molecule.

The crosslinkable group is not particularly limited. Examples include radically polymerizable groups, cationically polymerizable groups, anionically polymerizable groups, epoxy, amine, isocyanate, and like groups. Radically polymerizable groups and isocyanate groups are particularly preferable in terms of versatility and reactivity.

The radically polymerizable group is not particularly limited. Examples of radically polymerizable groups include vinyl, (meth)acryl, styryl, maleimide, and like groups.

For example, as the radically polymerizable group, (meth)acryl and styryl groups are preferable in terms of versatility and reactivity.

Among the polyfunctional crosslinkable compounds (B), examples of radically polymerizable-group-containing compounds (B-1) include, but are not limited to, compounds represented by the following formula (1):

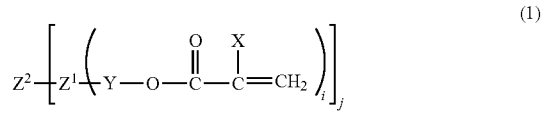

(wherein X is a hydrogen atom, a fluorine atom, a chlorine atom, a bromine atom, an iodine atom, $CFX^1X^2$ (wherein $X^1$ and $X^2$ are the same or different and represent a hydrogen atom, a fluorine atom, or a chlorine atom), a cyano group, a $C_{1-21}$ linear or branched fluoroalkyl group, a substituted or unsubstituted benzyl group, a substituted or unsubstituted phenyl group, or a $C_{1-20}$ linear or branched alkyl group; Y is a direct bond, a $C_{1-10}$ hydrocarbon group optionally having an oxygen atom, —$CH_2CH_2N(R)SO_2$— (wherein $R^1$ is $C_{1-4}$ alkyl, the right end of the formula is bound to $Z^1$, and the left end of the formula is bound to O), —$CH_2CH(OY^1)CH_2$— (wherein $Y^1$ is a hydrogen atom or an acetyl group, the right end of the formula is bound to $Z^1$, and the left end of the formula is bound to O), or —$(CH_2)_rSO_2$— (wherein r is 1 to 10, the right end of the formula is bound to $Z^1$, and the left end of the formula is bound to O), Z is a residue obtained by removing i+1 hydrogen atoms from a hydrocarbon optionally having (an) oxygen and/or fluorine atom(s), or a carbon atom or an oxygen atom; and $Z^2$ is a residue obtained by removing j hydrogen atom(s) from a hydrocarbon optionally having (an) oxygen and/or fluorine atom(s), or a carbon atom or an oxygen atom; i is an integer of 1 to 3; j is an integer of 1 to 4; and i multiplied by j is 2 or more).

In the above formula (1), the hydrocarbon may be cyclic or non-cyclic and may be linear or branched. Although this is not limitative, the hydrocarbon in formula (1) preferably has 1 to 10 carbon atoms, more preferably 1 to 6 carbon atoms, and even more preferably 1 to 2 carbon atoms.

Specific examples of acrylic esters represented by the above formula (1) are as follows.

$$CH_3-CH_2-C(CH_2OOC-CH=CH_2)_3$$

$$C(CH_2OOC-CH=CH_2)_4$$

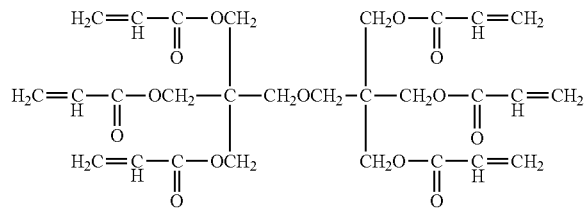

Examples of commercially available acrylic acid esters represented by formula (1) include A-TMPT (produced by Shin-Nakamura Chemical Co., Ltd.), A-TMMT (produced by Shin-Nakamura Chemical Co., Ltd.), A-DPH (produced by Shin-Nakamura Chemical Co., Ltd.), and the like.

The compound (B-1), which has a radically polymerizable group, may be a fluorine-containing compound. In this case, the coating film of the present invention can exhibit better liquid repellency.

The radically polymerizable-group-containing compound (B-1), which is a fluorine-containing compound, is not particularly limited and can be selected from a wide range. Examples include compounds having a structure represented by any one of the following formulas (2) to (4).

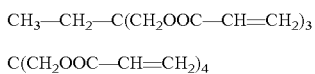 (2)

(wherein $Rf^1$ may be a linear or branched, monovalent or divalent perfluorocarbon group wherein at least one carbon atom may be substituted with a hetero atom and a carbon-carbon unsaturated bond may be present;
$R^1$ is a branched or cyclic, trivalent or higher-valent hydrocarbon or carbonyl group wherein at least one carbon atom may be substituted with a hetero atom, at least one hydrogen atom may be substituted with a halogen atom, and a carbon-carbon unsaturated bond may be present;
$Z^3$ may be a linear or branched, monovalent hydrocarbon or carbonyl group having a polymerizable group at at least one end, wherein at least one carbon atom may be substituted with a hetero atom, at least one hydrogen atom may be substituted with a halogen atom, and a carbon-carbon unsaturated bond may be present;
k is an integer of 1 or more; and l is an integer of 2 or more).
$Rf^1$ may be perfluoroalkyl, perfluoroalkeny, perfluoroalkynyl, or perfluoropolyether (sometimes referred to as "PFPE").

$Rf^1$ preferably has 1 to 200 carbon atoms, more preferably 2 to 150 carbon atoms, and more preferably 3 to 100 carbon atoms.
$R^1$ preferably has 1 to 100 carbon atoms, more preferably 1 to 75 carbon atoms, and even more preferably 1 to 50 carbon atoms.
$Z^3$ preferably has 1 to 20 carbon atoms, more preferably 2 to 15 carbon atoms, and even more preferably 3 to 10 carbon atoms.

Examples of compounds having a structure represented by formula (2) include, but are not limited to, compounds having a pentaerythritol skeleton, compounds having a dipentaerythritol skeleton, compounds having a trimethylolpropane skeleton, compounds having an isocyanurate skeleton, compounds having a linear skeleton, and the like. These compounds are known as disclosed, for example, in JP2009-198627A and JP2003-509007A. Although this is not limitative, compounds having a structure represented by formula (2) can also be appropriately selected from such known compounds.

As an example of compounds having a pentaerythritol skeleton, for example, a compound having three $Z^3$s having a vinyl group at the end can be mentioned. Specific examples of such compounds include the following.

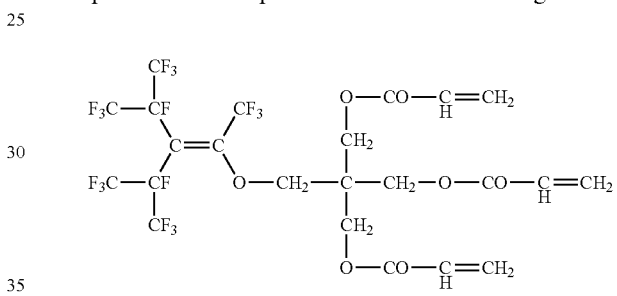

Examples of commercially available compounds represented by formula (2) include LINC-3A (produced by Shin-Nakamura Chemical Co., Ltd.) and the like.

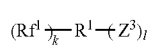 (3)

(wherein $Z^4$ may be a linear or branched, monovalent hydrocarbon or carbonyl group having at least one polymerizable group at at least one end, wherein at least one hydrogen atom may be substituted with a hetero group, at least one hydrogen atom may be substituted with a halogen atom, and a carbon-carbon saturated bond may be present;
$Rf^2$ is a branched or cyclic, divalent or higher-valent perfluorocarbon group wherein at least one carbon atom may be substituted with a hetero atom, and a carbon-carbon unsaturated bond may be present; and
m is an integer of 2 or more).
$Rf^2$ may be perfluoroalkyl, perfluoroalkenyl, perfluoroalkynyl, or perfluoropolyether.
$Rf^2$ preferably has 1 to 20 carbon atoms, more preferably 2 to 15 carbon atoms, and even more preferably 3 to 10 carbon atoms.
$Z^4$ preferably has 1 to 20 carbon atoms, more preferably 2 to 15 carbon atoms, and even more preferably 3 to 10 carbon atoms.

Examples of compounds having the structure represented by formula (2) include, but are not particularly limited to, compounds having a cyclohexyl skeleton.

An example of compounds having a cyclohexyl skeleton is a compound having two $Z^4$s having a vinyl group at an end. Specific examples of such compounds are shown below.

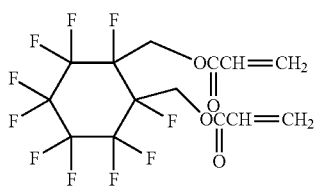

Examples of commercially available compounds represented by formula (3) include LINC-102A (produced by Shin-Nakamura Chemical Co., Ltd.), and the like.

$$R^2\!\!-\!\!(Z^5)_n \quad (4)$$

(wherein $Z^5$ is a linear or branched, monovalent hydrocarbon or carbonyl group having a perfluoroethylene group at at least one end, wherein at least one carbon atom may be substituted with a hetero atom, at least one hydrogen atom may be substituted with a halogen atom, and a carbon-to-carbon unsaturated bond may be present;
$R^2$ may be a branched or cyclic, divalent or higher-valent hydrocarbon or carbonyl group wherein at least one carbon may be substituted with a hetero atom, at least one hydrogen atom may be substituted with a halogen atom, at least one carbon may be substituted with a hetero atom, and a carbon-to-carbon unsaturated bond may be present;
n is an integer of 2 or more).

$R^2$ preferably contains 1 to 20 carbon atoms, more preferably 2 to 15 carbon atoms, and even more preferably 3 to 10 carbon atoms.

$Z^5$ preferably contains 1 to 20 carbon atoms, more preferably 2 to 15 carbon atoms, and even more preferably 3 to 10 carbon atoms.

Examples of compounds having a structure represented by formula (4) include, but are not particularly limited to, compounds having a pentaerythritol skeleton, compounds having a dipentaerythritol skeleton, compounds having a trimethylolpropane skeleton, and compounds having a linear skeleton.

Examples of compounds having a pentaerythritol skeleton include compounds having three $Z^5$s having a perfluoroethylene group at an end. Specific examples of such compounds are as follows.

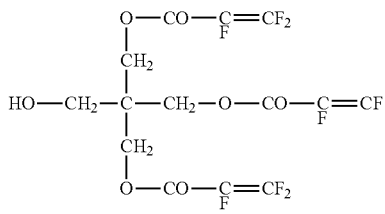

Although the present invention is not bound by theory, the coating film of the present invention has a structural feature that can be obtained by copolymerization using the fine particles having a polymerizable group on the surface and the polyfunctional polymerizable compound. This structural feature presumably leads to providing excellent abrasion resistance.

Among the polyfunctional crosslinkable compounds (B), examples of the isocyanate group-containing compound (B-2) include, but are not limited to, compounds represented by formula (5).

$$R^3\!\!-\!\!(Z^6)_o \quad (5)$$

(wherein $Z^6$ is a linear or branched, monovalent hydrocarbon or carbonyl group having an isocyanate group at at least one end, wherein at least one carbon atom may be substituted with a hetero atom, at least one hydrogen atom may be substituted with a halogen atom, and a carbon-carbon unsaturated bond may be present;
$R^3$ is a branched or cyclic, divalent or higher-valent hydrocarbon or carbonyl group wherein at least one carbon may be substituted with a hetero atom, at least one hydrogen atom may be substituted with a halogen atom, at least one carbon may be substituted with a hetero atom, and a carbon-to-carbon unsaturated bond may be present; and o is an integer of 2 or more).

$R^3$ preferably has 1 to 20 carbon atoms, more preferably 2 to 15 carbon atoms, and even more preferably 3 to 10 carbon atoms.

$Z^6$ is preferably 1 to 20 carbon atoms, more preferably 2 to 15 carbon atoms, and even more preferably 3 to 10 carbon atoms.

The isocyanate (—NCO)-containing compound (B-2) may be used singly or in a combination of two or more.

Examples of the isocyanate group-containing compound, which is compound (B-2), include polyisocyanates. In this specification, polyisocyanates mean compounds having two or more isocyanate groups in the molecule. The compound (B-2) may be a polyisocyanate obtained by trimerizing a diisocyanate. The polyisocyanate obtained by trimerizing a diisocyanate may be a triisocyanate. The polyisocyanate as a trimer of a diisocyanate may be present in the form of a polymer obtained by polymerizing such polyisocyanates.

Examples of diisocyanates include, but are not particularly limited to, trimethylene diisocyanate, hexamethylene diisocyanate, isophorone diisocyanate, xylylene diisocyanate, hydrogenated xylylene diisocyanate, cyclohexane diisocyanate, dicyclohexylmethane diisocyanate, norbornane diisocyanate, and like diisocyanates wherein isocyanate groups are bound to aliphatic groups; tolylene diisocyanate, diphenylmethane diisocyanate, polymethylene polyphenyl polyisocyanates, tolidine diisocyanate, naphthalene diisocyanate, and like diisocyanates wherein isocyanate groups are bound to aromatic groups; and the like.

Specific examples of polyisocyanates include, but are not limited to, compounds having the following structure.

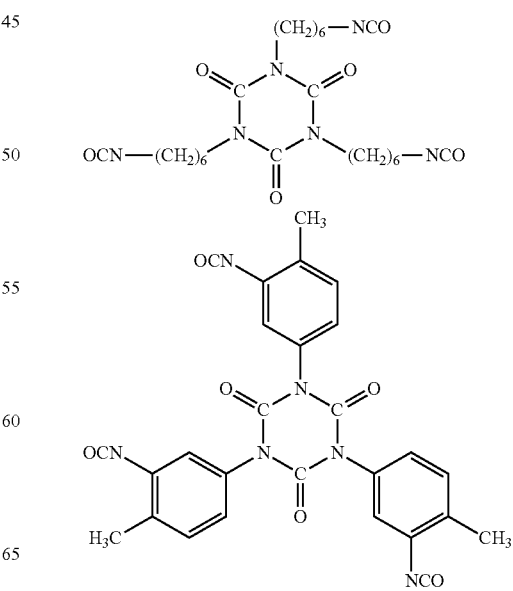

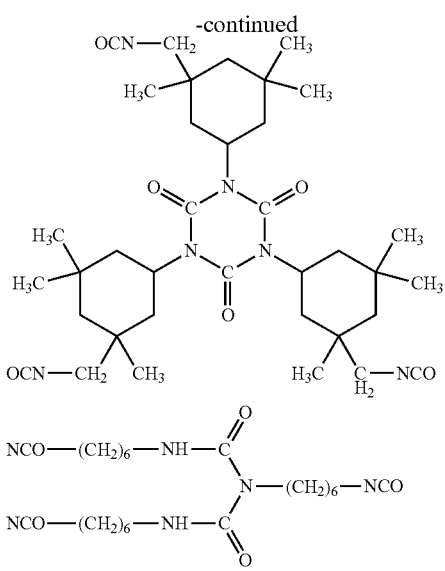

These polyisocyanates may be present as polymers. For example, when the polyisocyanate is an isocyanurate-type polyisocyanate of hexamethylene diisocyanate, the polyisocyanate may include a polymer having the following structure.

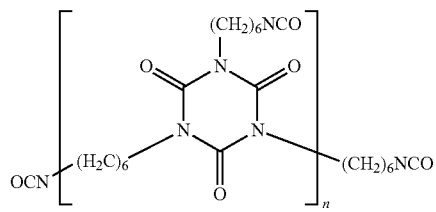

In a preferable embodiment, the compound (B-2) is an isocyanurate-type polyisocyanate.

In another embodiment using two or more compounds (B-2), a mixture comprising an isocyanurate-type polyisocyanate as compound (B-2) can be used. The isocyanurate-type polyisocyanate may be, for example, a triisocyanate. Specifically, the isocyanurate-type polyisocyanate may be a triisocyanate obtained by trimerizing a diisocyanate.

When two or more compounds (B-2) are used, for example, commercially available products can be used as a mixture of two or more compounds (B-2). Examples of such commercially available products include Sumidur® N3300 (produced by Sumika Covestro Urethane Co., Ltd.), Desmodur® N3600 (produced by Sumika Covestro Urethane Co., Ltd.), Desmodur T, L, IL, HL series (produced by Sumika Bayer Urethane, Co., Ltd.), Desmodur® 2460M (produced by Sumika Bayer Urethane, Co., Ltd.), Sumidur® 44 series (produced by Sumika Bayer Urethane, Co., Ltd.), SBU isocyanate series (produced by Sumika Bayer Urethane, Co., Ltd.), Desmodur® E, M series (produced by Sumika Bayer Urethane, Co., Ltd.), Sumidur HT (produced by Sumika Bayer Urethane, Co., Ltd.), Desmodur N series (produced by Sumika Bayer Urethane, Co., Ltd.), Desmodur Z4470 series (produced by Sumika Bayer Urethane, Co., Ltd.), Duranate TPA-100 (produced by Asahi Kasei Corporation), Duranate TKA-100 (produced by Asahi Kasei Corporation), Duranate 24A-100 (produced by Asahi Kasei Corporation), Duranate 22A-75P (produced by Asahi Kasei Corporation), and Duranate P301-75E (produced by Asahi Kasei Corporation).

When the curable composition for forming a coating film of the present invention contains an isocyanate group-containing compound (B-2), a compound having a functional group that can react with the isocyanate group and a radically polymerizable group may be further incorporated in the composition to produce a compound having a radically polymerizable group as described below when cured. As long as at least two radically polymerizable groups are present at ends of the compound reacted with isocyanate groups, as with the compound described below, radically reactive groups do not have to be present at all the ends of the compound. The curable composition for forming a coating film may contain as a polyfunctional crosslinkable compound (B) the radically polymerizable-group-containing compound produced above.

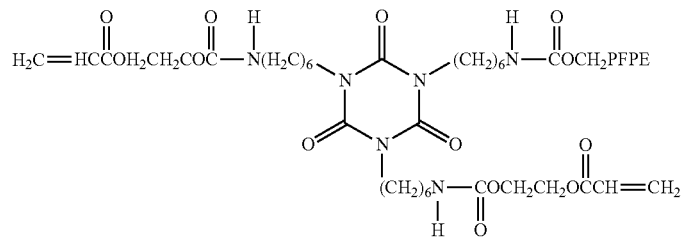

The isocyanurate-type polyisocyanate may be in the form of a polymer obtained by polymerizing such polyisocyanates. The isocyanurate-type polyisocyanate may be a monocyclic compound having only one isocyanurate ring, or a polycyclic compound obtained by polymerizing such a monocyclic compound.

In one embodiment using two or more compounds (B-2), a mixture comprising a monocyclic compound having only one isocyanurate ring can be used.

In the above formula, PFPE represents a perfluoropolyether group.

The polyfunctional crosslinking compounds (B) can be used singly or in a combination of two or more.

To obtain the coating film of the present invention, the composition may further contain, in addition to the fine particles (A) and polyfunctional crosslinkable compound (B), at least one compound having one reactive group in the molecule (also referred to as a "monofunctional polymerizable compound") as a constituent component. Such a compound preferably has a structure that enables the compound to react with component (A) or (B) upon irradiation with ultraviolet rays or heating.

2.3 Preferable Embodiments

Preferable embodiments of the curable composition for forming a coating film of the present invention include, but are not limited to, the following:

a curable composition for forming a coating film comprising
(A) fine particles having at least one fluorine-modified compound bound to the surface; and
(B) a compound containing two or more crosslinkable groups in the molecule;
the coating film after curing having an average surface roughness Ra of 0.5 to 20 μm, and
having a surface with a specific surface area ratio of 1.7 to 5.

More preferable embodiments of the curable composition for forming a coating film of the present invention include, but are not limited to, the following:

a curable composition for forming a coating film comprising
(A) fine particles having at least one fluorine-containing modified compound bound to the surface; and
(B) a compound containing at least two polymerizable groups in the molecule;
the coating film after curing having an average surface roughness Ra of 0.5 to 20 μm and
having a surface with a specific surface area ratio of 1.7 to 5;
a contact angle with water of 150° or more; and
a contact angle with n-hexadecane of 80° C. or more.

The fine particles (A) and polyfunctional crosslinkable compound (B) are as described above.

2.4. Reaction Accelerator

2.4.1 Polymerization Initiator

The curable composition for forming a coating film may further contain a polymerization initiator, if necessary. In particular, when component (B-1) is used as a polyfunctional crosslinkable compound, using a polymerization initiator is preferable. Examples of polymerization initiators include, but are not limited to, polymerization initiators that generate radicals or cations upon irradiation with electromagnetic waves in the wavelength range of 350 nm or less, such as ultraviolet rays, electron beams, X-rays, or γ-rays, and that function as a catalyst that initiates curing (a crosslinking reaction) of a carbon-carbon bond of a fluorine-containing polymer. In general, using a polymerization initiator that generates radicals or cations upon irradiation with ultraviolet rays is preferable; in particular, using a polymerization initiator that generates radicals upon irradiation with ultraviolet rays is preferable. For example, the following can be mentioned as examples of polymerization initiators.

Acetophenone-based polymerization initiators: acetophenone, chloroacetophenone, diethoxyacetophenone, hydroxyacetophenone, α-aminoacetophenone, hydroxypropiophenone, 2-methyl-1-[4-(methylthio)phenyl]-2-morpholinepropane-1-one, and the like.

Benzoin-based polymerization initiators: benzoin, benzoin methyl ether, benzoin ethyl ether, benzoin isopropyl ether, benzoin isobutyl ether, benzyl dimethyl ketal, and the like.

Benzophenone-based polymerization initiators: benzophenone, benzoylbenzoic acid, methyl benzoyl benzoate, 4-phenylbenzophenone, hydroxybenzophenone, hydroxypropylbenzophenone, acrylized benzophenone, Michler's ketone, and the like.

Thioxanthone-based polymerization initiators: thioxanthone, chlorothioxanthone, methylthioxanthone, diethylthioxanthone, dimethylthioxanthone, and the like.

Others: benzyl, α-acyloxime ester, acylphosphine oxide, glyoxy ester, 3-ketocoumarin, 2-ethylanthraquinone, camphorquinone, anthraquinone, and the like.

Not only the initiators that generate radicals by light energy but also initiators that generate radicals by heat energy may also be used. The amount of the polymerization initiator used to generate radicals by light energy is not particularly limited. In general, the amount of the polymerization initiator is preferably about 0.01 to 20 parts by weight, more preferably about 0.1 to 10 parts by weight, per 100 parts by weight of the monomer component.

As the initiator that generates radicals by heat energy, any known polymerization initiator for thermal radical polymerization reaction can be used. Examples include azo initiators such as azobisisobutyronitrile, methyl azoisobutyrate, and azobisdimethylvaleronitrile; benzoyl peroxide, potassium persulfate, ammonium persulfate, benzophenone derivatives, phosphine oxide derivatives, benzoketone derivatives, phenylthioether derivatives, azide derivatives, diazo derivatives, disulfide derivatives, and the like. These polymerization initiators can be used singly or in a combination of two or more.

The amount of the polymerization initiator used is not particularly limited. In general, the amount of the polymerization initiator is preferably about 0.01 to 10 parts by weight, and more preferably about 3 to 7 parts by weight, per 100 parts by weight of the monomer component.

2.4.2 Catalytically Active Agent for Hydroxyl and Isocyanate Groups

The curable composition for forming a coating film of the present invention may further contain a catalytically active agent for hydroxy and isocyanate groups, if necessary. In particular, when the component (B-2) is used as a polyfunctional crosslinkable compound, using a catalytically active agent is preferable. Examples of catalytically active agents include, but are not limited to, organic titanium compounds such as titanium tetra-2-ethyl hexoxide and titanium diisopropoxybis(ethylacetoacetate); and organic zirconia compounds such as zirconium tetra acetylacetonate and zirconium dibutoxybis(ethylacetoacetate). Examples of commercially available compounds include Olga Chicks TA-30 (produced by Matsumoto Fine chemicals), TC-750 (produced by Matsumoto Fine chemicals), ZC-580 (produced by Matsumoto Fine chemicals), ZC-700 (produced by Matsumoto Fine chemicals), and the like.

2.5 Fluorine-Based Solvent (C)

The composition for forming the curable coating film of the present invention may further contain a single solvent or a mixed solvent in which each component, such as a polymerization initiator, in addition to the above components (A) and (B), can be uniformly dissolved. Examples of single solvents include fluorine-based solvents (C) and the like. Examples of mixed solvents include a mixture containing a fluorine-based solvent (C). Specific examples include a fluorine-based solvent/IPA (50/50 (w/w)) mixed solution, a fluorine-based solvent/IPA (75/25 (w/w)) mixed solution, a fluorine-based solvent/IPA (95/5 (w/w)) mixed solution, a fluorine-based solvent/butyl acetate (80/20) mixed solvent, a fluorine-based solvent/butyl acetate (67/33) mixed solvent, a fluorine-based solvent (50/50) mixed solvent, and the like.

As long as the fluorine-based solvent contains a fluorine atom in the molecule and is a solvent in which the fluorine-containing polymer formed is highly soluble, the fluorine-based solvent may be any solvent, such as hydrocarbon compounds, alcohols, and ethers, and may be aliphatic or aromatic. Specific examples include chlorinated fluorinated hydrocarbons (particularly having 2 to 5 carbon atoms), in particular, HCFC225 (dichloropentafluoropropane)(AK-225 (produced by Asahi Glass Co., Ltd.)), HCFC141b (dichlorofluoroethane), CFC316 (2,2,3,3-tetrachlorohexafluorobutane), Vertrel XF (chemical formula $C_5H_2F_{10}$) (produced by Du Pont, Inc.), AC-6000 (produced by Asahi Glass Co., Ltd.) (chemical name: tridecafluorooctane), hexafluoro-m-xylene, pentafluoropropanol, fluorine-based ether, and the like.

In the present invention, using hydrofluoroether as a fluorine-based solvent is particularly preferable.

Hydrofluoroether is a solvent that is chemically less erosive to various materials and is particularly suitable as a solvent for forming a coating film on electronic components that strongly require elimination of adverse effects of solvents. Further, hydrofluoroether is an ideal solvent that has excellent performance in terms of quick drying, low environmental pollution, non-flammability, low toxicity, etc.

The hydrofluoroether to be used is preferably a hydrofluoroether having a boiling point of 100° C. or less at atmospheric pressure.

In the present invention, the hydrofluoroether is preferably a compound represented by the following formula (6):

$$C_xF_{2x+1}\text{—O—}C_yH_{2y+1} \qquad (6)$$

(wherein x is a number of 1 to 6 and y is a number of 1 to 6). Examples of such hydrofluoroethers include Novec® 7100 produced by Sumitomo 3M Limited, Inc. (chemical formula: $C_4F_5OCH_3$) (boiling point: 61° C.), Novec® 7200 produced by Sumitomo 3M Limited (chemical formula: $C_4F_9OC_2H_5$) (boiling point: 76° C.), and Novec® 7300 produced by Sumitomo 3M Limited (chemical formula: $C_6F1_3OCH_3$) (boiling point: 98° C.).

2.6 Other Features

The curable composition for forming a coating film of the present invention is a composition used to form a coating film of the present invention on a surface to be treated. The composition for forming a coating film of the present invention can be used to form a coating film of the present invention on a surface to be treated, thereby coating the surface to be treated.

The curable composition for forming a coating film of the present invention preferably has a solids content of about 0.01 to 10 wt. %, and more preferably about 1 to 6 wt. %.

The curable composition for forming a coating film according to a preferable embodiment of the present invention is a curable composition for forming a coating film such that a coating film formed of the composition has a static contact angle with water of 150° or more and a static contact angle with an n-HD of 80° or more; and preferably has a static contact angle with water of 150° or more, a static contact angle with an n-HD of 90° or more, and a sliding angle with water of 10° or less. The curable composition for forming a coating film according to a more preferable embodiment of the present invention is a curable composition for forming a coating film such that a coating film formed of the composition has a static contact angle with water of 150° or more, a static contact angle with n-HD of 90° or more, a sliding angle with water of 10° or less, and a sliding angle with n-HD of 30° or less; preferably has a static contact angle with water of 150° or more, a static contact angle with n-HD of 120° or more, a sliding angle with water of 5° or less, and a sliding angle with n-HD of 20° or less; more preferably has a static contact angle with water of 150° or more, a static contact angle with n-HD of 150° or more, a sliding angle with water of 3° or less, and a sliding angle with n-HD of 5° or less. The sliding angle referred to above means the average of the values measured at three points by using a Drop Master 701 contact angle meter or an equivalent and setting the volume of each of water and n-HD as 20 μl.

The target to which the curable composition for forming a coating film of the present invention is applied is not particularly limited. Examples of the materials to which the composition is applied include glass, resins (e.g., natural or synthetic resins, such as common plastic materials, which may be in the form of a plate, film, or other forms), metals (e.g., pure metal elements, such as aluminum, copper, and iron, or complexes, such as alloys), ceramics, semiconductors (e.g., silicon, germanium, etc.), fibers (e.g., fabrics, non-woven fabrics, etc.), fur, leather, wood materials, pottery, stone materials, architectural components, and like any appropriate materials.

By using the curable composition for forming a coating film of the present invention, a liquid repellent coating film can be formed on such a surface to be treated. In a preferable embodiment, a coating film with excellent durability against at least one stimulation selected from the group consisting of solvent immersion, immersion in water, wiping, abrasion, high-temperature and high-humidity, and the like can be formed.

The use of the curable composition for forming a coating film of the present invention is not particularly limited. For example, the curable composition for forming a coating film can be used as a water-repellent and oil-repellent agent, an anti-stick agent for proteins, cells, and microorganisms, an agent for frost delay, anti-icing, and snow protection, an anti-fingerprint agent, a fingerprint non-identification agent, a low-friction agent, a lubricant, and the like.

3. Method for Producing Coating Film

The method for producing a coating film by using the curable composition for forming a coating film of the present invention is explained below.

The coating film of the present invention can be obtained by curing a curable component contained in the curable composition for forming a coating film on the surface to be treated. As the curable component, at least one polymerizable compound can be used. The coating film can be cured by polymerizing the polymerizable compound.

The method for applying the curable composition for forming a coating film of the present invention to the surface to be treated is not particularly limited. The curable composition for forming a coating film of the present invention can be applied to the object to be treated, for example, by brush coating, spraying, spin coating, using a dispenser, or like methods. To facilitate the application, the surface to be treated may be subjected to various primer treatments beforehand, if necessary.

The coating film of the present invention can be formed by bringing the curable composition for forming a coating film of the present invention into contact with the object to be treated and then curing the curable component. When the curable composition for forming a coating film of the present invention contains fine particles (A) and a radically polymerizable-group-containing compound (B-1) among polyfunctional crosslinkable compounds (B) as a curable component, the coating film of the present invention can be produced by subjecting the fine particles (A) and the radically polymerizable-group-containing compound (B-1) to a polymerization reaction. Specifically, in this case, the fine particles (A) and the radically polymerizable-group-containing compound (B-1) can be (i) simultaneously polymerized on the surface to be treated, or (ii) sequentially polymerized by dividing the polymerization process into at least two stages.

When the curable composition for forming a coating film of the present invention is cured by a polymerization reaction, the polymerization reaction can be performed in the presence or absence of a polymerization initiator. Although this is not limitative, for example, methods for performing polymerization using heat and electromagnetic waves in the wavelength range of 350 nm or less, such as ultraviolet rays, electron beams, X-rays, or γ-rays, can be used.

The method for performing polymerization on the object to be treated without using a polymerization initiator is not particularly limited. Examples include methods of polymerization using heat, electron beams, γ-rays, etc.

When the above step (ii) is used, the polymerization is preferably performed by dividing the process into two stages, although this is not limitative.

When the above step (ii) is used, at least one polyfunctional polymerizable compound (B) is preferably polymerized on the object to be treated at the second stage or any subsequent stage, although this is not limitative. More preferably, at least one polyfunctional polymerizable compound (B) is polymerized on the object to be treated at the final stage. Specifically, a polyfunctional polymerizable compound (B) can be polymerized with the fine particles (A) or with a polymer obtained by polymerizing the fine particles (A) and the compound having one polymerizable group in the molecule beforehand. The polyfunctional polymerizable compound to be used is not particularly limited as long as the polymerization proceeds. The polymerizable group is preferably a radically polymerizable group, and more preferably (meth)acrylate. The constituent atom of the polyfunctional polymerizable compound is not particularly limited as long as the polymerization proceeds. The polyfunctional polymerizable compound preferably contains a fluorine atom as a constituent atom in terms of liquid repellency of the resulting coating film.

The polymerization conditions, such as polymerization temperature and polymerization time, can be appropriately adjusted according to the type of monomer component, the amount of monomer component used, type of polymerization initiator, the amount of polymerization initiator used, etc. The polymerization may be usually performed at a temperature of about 50 to 100° C. for 4 to 10 hours.

After the curable composition for forming a coating film of the present invention is placed into contacted with an object to be treated, the curable component is cured to thereby form a coating film of the present invention. When the curable composition for forming a coating film of the present invention contains fine particles (A) and an isocyanate group-containing compound (B-2) among polyfunctional crosslinkable compounds (B) as a curable component, the coating film of the present invention can be produced by preparing fine particles (A), then producing a solution in which the fine particles (A) and the isocyanate group-containing compound (B-2) are present together, and allowing the solution to develop on the object to be treated.

When the curable composition for forming a coating film of the present invention is cured using components (A) and (B-2), heating is preferably performed, although this is not limitative. The heating temperature and time are not particularly limited. For example, the temperature is preferably about 30° C. to 300° C., and more preferably about 40° C. to 270° C., and the time is preferably 1 second to 2 hours, and more preferably about 5 seconds to about 1 hour and 30 minutes. In any case, the time may be appropriately set according to the temperature set.

To form a coating film with higher durability, it is preferable that before treatment with the curable composition for forming a coating film of the present invention, the base material is preferably washed with a solvent, such as acetone, isopropyl alcohol (IPA), hydrofluoroether, or a mixed solvent thereof to remove contaminants from the surface of the base material and then dried. Further, for silicon base materials or metal base materials, in addition to the above washing, chemical cleaning using acids (e.g., hydrochloric acid, nitric acid, hydrogen fluoride), U ozone, etc., or physical cleaning using sandblasting, glass beads, plasma, etc. is also useful to improve durability enhancement. More preferably, abrasion resistance is enhanced by modifying the surface with a compound capable of being chemically adsorbed onto the washed base material and having in its structure a site capable of chemically reacting with the curable composition for forming a coating film.

EXAMPLES

The present invention is described in more detail with reference to Examples and Comparative Examples. However, the scope of the invention is not limited to these Examples.

Example 1: Production of Thin Film Comprising Copolymer of Rf(C6)Methacrylate and Fine Particles, and TAHFNHA at a Copolymer/TAHFNHA Ratio of 60/40 (w/w)

Preparation of Solution of Copolymer of Rf(C6)Methacrylate and Fine Particles

After 25.46 g of $C_6F_{13}CH_2CH_2OOC(CH_3)=CH_2$ (hereinafter sometimes abbreviated as "Rf(C6)methacrylate"), 12.70 g of silica particles having an average primary particle diameter of 12 nm and having a radically reactive group on the surface, and 663.49 g of perfluorobutylethyl ether were placed in a side arm test tube, the test tube was purged with nitrogen and heated to 70° C. Further, 1.26516 g of AIBN was added thereto and a reaction was allowed to proceed for 6 hours. After polymerization, the solids concentration was calculated.

Preparation of Photosensitive Solution

After 0.3256 g of triacryloylheptadecafluorononenyl pentaerythritol (hereinafter sometimes referred to as "TAHFNHA"), 0.0413 g of an alkylphenone-based photopolymerization initiator, 1.0949 g of IPA, and 7.4783 g of perfluorobutyl ethyl ether were placed in a vial and irradiated with an ultrasonic wave using an ultrasonic washing machine, and 11.8650 g of a copolymer solution with a solids content of 4.19% was added. The resulting mixture was irradiated with ultrasonic waves using an ultrasonic washing machine to produce a photosensitive solution.

Production of Coating Film

A silicon base material was treated with the photosensitive solution by the dip method. A treated acrylic base material was then placed in a metal box in which gas can flow, and nitrogen was allowed to flow in the box at a flow rate of 10 L/min for 3 minutes. The entire box was then placed in a belt-conveyor UV irradiation device and irradiated with ultraviolet rays at 1,800 n/cm². The fluorine atom content of the obtained coating film was 41.5 wt %, based on the all the coating film components.

Example 2: Production of Thin Film Comprising Copolymer of Rf(C6)Methacrylate and Fine Particles, and TAHFNHA at a Copolymer/TAHFNHA Ratio of 50/50 (w/w)

A thin coating film was prepared in the same manner as in Example 1 except that the amounts of the following components described in the Preparation of Photosensitive Solution section were changed as follows: 0.4157 g of TAHFNHA, 0.0404 g of the alkylphenone-based photopolymerization initiator, 1.0675 g of IPA, 9.5001 g of perfluorobutylethyl ether, and 9.6917 g of the copolymer solution were used. The fluorine atom content of the obtained coating film was 42.3 wt %, based on all the coating film components.

Example 3: Production of Thin Film Comprising Copolymer of Rf(C6)Methacrylate and Fine Particles, and TAHFNHA at a Copolymer/TAHFNHA Ratio of 40/60 (w/w)

A thin coating film was prepared in the same manner as in Example 1 except that the amounts of the following components described in the Preparation of Photosensitive Solution section were changed as follows: 0.4817 g of TAHFNHA, 0.0402 g of the alkylphenone-based photopolymerization initiator, 1.1468 g of IPA, 11.5713 g of perfluorobutylethyl ether, and 8.0478 g of the copolymer solution were used. The fluorine atom content of the obtained coating film was 43.3 wt %, based on all the coating film components.

Example 4: Production of Thin Film Comprising Copolymer of Rf(C6)Methacrylate and Fine Particles, and TAHFNHA at a Copolymer/TAHFNHA Ratio of 30/70 (w/w)

A thin film was prepared in the same manner as in Example 1 except that the amounts of the following components described in the Preparation of Photosensitive Solution section were changed as follows: 0.5889 g of TAHFNHA, 0.0429 g of the alkylphenone-based photopolymerization initiator, 1.0454 g of IPA, 13.4581 g of the perfluorobutylethyl ether, and 5.8905 g of the copolymer solution were used. The fluorine content of the obtained coating film was 44.1 wt %, based on all the coating film components.

Example 5: Production Comprising Thin Film of Copolymer of Rf(C6)Methacrylate and Fine Particles, and TMPTA at a Copolymer/TMPTA Ratio of 60/40 (w/w)

A thin film was prepared in the same manner as in Example 1 except that the kinds or amounts of the following components described in the Preparation of Photosensitive Solution section were changed as follows: 0.3213 g of trimethylolpropane triacrylate (hereinafter sometimes abbreviated as "TMPTA") was used in place of TAHFNHA; and 0.0415 g of the alkylphenone-based photopolymerization initiator, 1.0969 g of IPA, 7.3269 g of perfluorobutylethyl ether, and 12.0015 g of the copolymer solution were used. The fluorine atom content of the obtained coating film was 22.9 wt %, based on all the coating film components.

Example 6: Production of Thin Film Comprising Copolymer of Rf(C6)Methacrylate and Fine Particles, and TMPTA at a Copolymer/TMPTA Ratio of 50/50 (w/w)

A thin film was prepared in the same manner as in Example 1 except that the kinds or amounts of the following components described in the Preparation of Photosensitive Solution section were changed as follows: 0.4015 g of TMPTA was used in place of TAHFNHA; and 0.0403 g of the alkylphenone-based photopolymerization initiator, 1.0668 g of IPA, 8.8769 g of perfluorobutylethyl ether, and 9.7518 g of the copolymer solution were used. The fluorine atom content of the obtained coating film was 19.1 wt %, based on all the coating film components.

Example 7: Production of Thin Film Comprising Copolymer of Rf(C6)Methacrylate and Fine Particles, and TMPTA at a Copolymer/TMPTA Ratio of 40/60 (w/w)

A thin film was prepared in the same manner as in Example 1 except that the kinds or amounts of the following components described in the Preparation of Photosensitive Solution section were changed as follows: 0.4858 g of TMPTA was used in place of TAHFNHA; and 0.0427 g of the alkylphenone-based photopolymerization initiator, 1.1095 g of IPA, 11.6517 g of perfluorobutylethyl ether, and 7.8134 g of the copolymer solution were used. The fluorine atom content of the obtained coating film was 15.2 wt %, based on all the coating film components.

Example 8: Production of Thin Film Comprising Copolymer of Rf(C6)Methacrylate and Fine Particles, and Sumidur N3300 (Produced by Sumitomo Bayer Urethane Co., Ltd., NCO Content: 21.9%) at a Copolymer/Sumidur N3300 Ratio of 60/40 (w/w)

Preparation of Solution of Copolymer of Rf(C6)Methacrylate and Fine Particles

A solution of a copolymer of Rf(C6)methacrylate and fine particles was prepared in the same manner as in Example 1.
Preparation of Solution After 0.025 g of TC-750, 0.483 g of Sumidur N3300, and 9.730 g of butylacetic acid were placed in a vial and irradiated with an ultrasonic wave using an ultrasonic washing machine, 14.390 g of the copolymer solution with a solids content of 5.19%, and 5.754 g of perfluorobutylethyl ether were added. The resulting mixture was irradiated with an ultrasonic wave using an ultrasonic washing machine to produce a photosensitive solution.
Production of Coating Film A silicon base material was treated with the photosensitive solution by the dip method and then subjected to a heat treatment at 130° C. for 1 hour. The fluorine atom content of the obtained coating film was 35.1 wt %, based on all the coating film components.

Example 9: Production of Thin Film Comprising Copolymer of Rf(C6)Methacrylate and Fine Particles, and Sumidur N3300 at a Copolymer/Sumidur N3300 Ratio of 50/50 (w/w)

A thin film was prepared in the same manner as in Example 8 except that the amounts of the following components described in the Preparation of Solution section were changed as follows: 0.030 g of TC-750, 0.599 g of Sumidur N3300, 9.760 g of butyl acetate, 11.938 g of the copolymer solution, and 8.055 g of perfluorobutylethyl ether were used. The fluorine atom content of the obtained coating film was 29.4 wt %, based on all the coating film components.

Example 10: Production of Thin Film Comprising Copolymer of Rf(C6)Methacrylate and Fine Particles, and Sumidur N3300 at a Copolymer/Sumidur N3300 Ratio of 40/60 (w/w)

A thin film was prepared in the same manner as in Example 8 except that the amounts of the following components described in the Preparation of Solution section were changed as follows: 0.037 g of TC-750, 0.721 g of Sumidur N3300, 9.583 g of butyl acetate, 9.278 g of the copolymer solution, and 11.879 g of perfluorobutylethyl ether were used. The fluorine atom content of the obtained coating film was 15.5 wt %, based on all the coating film components.

Example 11: Production of Thin Film Comprising Copolymer of Rf(C6)Methacrylate, HEMA, and Fine Particles, and Sumidur N3300 at a Copolymer/Sumidur N3300 Ratio of 50/50 (w/w)

Preparation of Solution of Copolymer of Rf(C6)Methacrylate and Fine Particles

After 7.98 g of Rf(C6)methacrylate, 2.07 g of hydroxyethyl methacrylate (sometimes abbreviated as "HEMA"), 4.95 g of silica particles having an average primary particle diameter of 12 nm and having a radically reactive group on the surface, 34.97 g of isopropyl alcohol, and 166.15 g of perfluorobutylethyl ether were placed in a side arm test tube, the test tube was purged with nitrogen and heated to 70° C. Further, 0.62000 g of AIBN was added thereto and a reaction was allowed to proceed for 6 hours. After polymerization, the solids concentration was calculated. The other conditions were the same as in Example 8 except that the amounts of the following components described in the Preparation of Solution section were changed as follows: 0.031 g of TC-750, 0.589 g of Sumidur N3300, 9.789 g of butyl acetate, 11.768 g of the copolymer solution with a solids content of 4.89%, and 8.140 g of perfluorobutylethyl ether were used. The fluorine atom content of the obtained coating film was 15.1 wt %, based on all the coating film components.

Comparative Example 1: Production of Thin Film Comprising Copolymer of Rf(C6)Methacrylate and Fine Particles, and TMPTA at a Copolymer/TMPTA Ratio of 30/70 (w/w)

A thin film was prepared in the same manner as in Example 1 except that the kinds or amounts of the following components described in the Preparation of Photosensitive Solution section were changed as follows: 0.5537 g of TMPTA was used in place of TAHFNHA; and 0.0409 g of the alkylphenone-based photopolymerization initiator, 1.1247 g of IPA, 13.5506 g of perfluorobutylethyl ether, and 5.8534 g of the copolymer solution were used. The fluorine atom content of the obtained coating film was 11.4 wt %, based on all the coating film components.

Comparative Example 2: Production of Thin Film Comprising Copolymer of Rf(C6)Methacrylate and Fine Particles After 7.47 g of a Rf(C6)methacrylate-fine particle copolymer solution and 9.92 g of IPA were placed in a screw tube and irradiated with an ultrasonic wave to disperse a Rf(C6) methacrylate-fine particle copolymer, a silicon base material was immersed in the solution to produce a coating film. The fluorine atom content of the obtained coating film was 38.1 wt %, based on all the coating film components.

Comparative Example 3: Production of Coating Film Comprising Rf(C6)Methacrylate Homopolymer Preparation of Polymer After 25.0 g of Rf(C6)methacrylate and 75.0 g of perfluorobutylethyl ether were placed in a side arm test tube, the test tube was purged with nitrogen for 10 minutes and heated to 70° C. Further, 0.136 g of AIBN was added and a reaction was allowed to proceed for 6 hours. After polymerization, the solids concentration was calculated.

Preparation of Coating Film 0.50 g of the polymerization solution and 115 g of perfluorobutylethyl ether were placed into a vial.

A silicon base material was immersed in the solution and dried with roan-temperature air for 30 minutes to form a coating film. The fluorine atom content of the obtained coating film was 57.2 wt %, based on all the coating film components.

Test Examples 1 to 14

The contact angle of each of the test pieces obtained in Examples 1 to 11 and Comparative Examples 1 to 3 with water or with n-HD was measured. The contact angle measurement and the device used were in accordance with the method disclosed in this specification.

TABLE 1

|  |  | Water (2.0 µl) | n-HD (2.0 µl) |
| --- | --- | --- | --- |
| Test Example 1 | Example 1 | 160.7 ± 3.3 | 124.5 ± 1.2 |
| Test Example 2 | Example 2 | 161.9 ± 2.8 | 117.0 ± 2.5 |
| Test Example 3 | Example 3 | 162.8 ± 1.8 | 110.6 ± 3.5 |
| Test Example 4 | Example 4 | 161.2 ± 7.1 | 85.2 ± 2.1 |
| Test Example 5 | Example 5 | 163.8 ± 1.9 | 127.0 ± 1.2 |
| Test Example 6 | Example 6 | 163.4 ± 2.2 | 120.3 ± 2.7 |
| Test Example 7 | Example 7 | 161.9 ± 3.3 | 95.9 ± 1.7 |
| Test Example 8 | Example 8 | 162.5 ± 2.9 | 122.3 ± 1.7 |
| Test Example 9 | Example 9 | 160.2 ± 1.2 | 116.7 ± 3.3 |
| Test Example 10 | Example 10 | 158.4 ± 2.3 | 91.2 ± 2.7 |
| Test Example 11 | Example 11 | 162.2 ± 1.5 | 96.5 ± 3.3 |
| Test Example 12 | Comp. Ex. 1 | 129.2 ± 2.6 | 81.7 ± 1.9 |
| Test Example 13 | Comp. Ex. 2 | 159.3 ± 2.5 | 130.8 ± 2.4 |
| Test Example 14 | Comp. Ex. 3 | 115.6 ± 1.5 | 73.2 ± 0.3 |

Test Examples 15 to 42

The following information on the test pieces obtained in Examples 1 to 11 and Comparative Examples 1 to 3 was obtained by the method disclosed herein.

Calculation of Specific Surface Area Ratio

The ratio of the surface area of the obtained film to the surface area of a truly smooth surface (specific surface area ratio) in a quadrangular area of 351.5 µm×351.5 µm was calculated using a VK-9710 produced by Keyance Corporation.

Calculation of Ra

The arithmetic average roughness Ra of the surface with a one-side length of 702.801 μm was calculated using a VK-9710 produced by Keyence Corporation. The above Ra was calculated at 5 points randomly selected from an observation area of 526.929 μm×702.801 μm. The average of the five measurements was calculated. Table 2 shows the results.

TABLE 2

|  |  | Surface area ratio |  | Ra (μm) |
|---|---|---|---|---|
| Example 1 | Test Example 15 | 2.74 | Test Example 29 | 1.56 |
| Example 2 | Test Example 16 | 2.50 | Test Example 30 | 1.20 |
| Example 3 | Test Example 17 | 2.29 | Test Example 31 | 1.31 |
| Example 4 | Test Example 18 | 2.20 | Test Example 32 | 0.89 |
| Example 5 | Test Example 19 | 3.11 | Test Example 33 | 1.61 |
| Example 6 | Test Example 20 | 2.80 | Test Example 34 | 1.15 |
| Example 7 | Test Example 21 | 2.21 | Test Example 35 | 0.86 |
| Example 8 | Test Example 22 | 3.02 | Test Example 36 | 1.52 |
| Example 9 | Test Example 23 | 2.75 | Test Example 37 | 1.10 |
| Example 10 | Test Example 24 | 2.25 | Test Example 38 | 0.84 |
| Example 11 | Test Example 25 | 2.67 | Test Example 39 | 1.13 |
| Comp. Ex. 1 | Test Example 26 | 1.85 | Test Example 40 | 0.67 |
| Camp. Ex. 2 | Test Example 27 | 3.02 | Test Example 41 | 1.80 |
| Comp. Ex. 3 | Test Example 28 | 1.00 | Test Example 42 | 0.08 |

* Ra is the average of the five measurements.

Test Example 43 to 54

Rubbing Test

The contact angle of each of the test pieces obtained in Examples 1 to 11 and Comparative Example 2 with water was measured to determine the initial contact angle. The surface of the test piece was then wiped off with a PET film (trade name: U-46, produced by Toray Industries, Inc.), which was mounted onto the holder of a rubbing tester ("Abrasion resistance tester 151E, triple series", a rubbing tester produced by Imoto Machinery Co., Ltd.) (area in contact with a test sample: 1 cm$^2$), under a load of 100 g for a predetermined number of times. The angle of each test piece with water was then measured to evaluate the abrasion resistance to wiping. The abrasion resistance performance was defined as the number of times of abrasion with which super water repellency (the average static contact angle of the five measurements was 150° or more; or the average static contact angle of the five measurements was 140° or more and the average plus standard deviations were 150° or more) can be maintained. Table 3 shows the results of the rubbing test.

TABLE 3

|  |  | Number of rubbing times with which durability is maintained |
|---|---|---|
| Test Example 43 | Example 1 | 2,000 |
| Test Example 44 | Example 2 | 2,250 |
| Test Example 45 | Example 3 | 2,000 |
| Test Example 46 | Example 4 | 1,500 |
| Test Example 47 | Example 5 | 1,500 |
| Test Example 48 | Example 6 | 1250 |
| Test Example 49 | Example 7 | 750 |
| Test Example 50 | Example 8 | 1750 |
| Test Example 51 | Example 9 | 1,250 |
| Test Example 52 | Example 10 | 800 |
| Test Example 53 | Example 11 | 1,500 |
| Test Example 54 | Comp. Ex. 2 | 20 |

This result confirmed that Examples 1 to 11 exhibited significantly enhanced abrasion resistance, as compared with Comparative Example 2.

The invention claimed is:

1. A coating film having a fluorine content of 1 to 60 wt %,
    wherein the coating film has a surface that has:
        an average surface roughness Ra of 0.5 to 20 μm,
        a specific surface area ratio of 1.7 to 5,
        a contact angle with water of 150° or more,
        a contact angle with n-hexadecane of 80° or more, and
        a contact angle with water of 150° or more after being rubbed 100 times with a PET film under a load of 100 g and
    wherein the coating filming is obtained by curing a curable composition for forming a coating film, the composition comprising:
        (A) fine particles with a mean particle size of 0.5 nm to 1000 nm having at least one fluorine-containing modified compound bound to the surface; and
        (B) a compound having 2 or more crosslinkable groups in the molecule at a (A)/(B) ratio of 60/40 to 40/60 (w/w).

2. A curable composition for forming a coating film, the composition comprising:
    (A) fine particles with a mean particle size of 0.5 nm to 1000 nm having at least one fluorine-containing modified compound bound to the surface; and
    (B) a compound having 2 or more crosslinkable groups in the molecule at a (A)/(B) ratio of 60/40 to 40/60 (w/w),
    wherein the coating film after curing having a surface that has:
        an average surface roughness Ra of 0.5 to 20 μm,
        a specific surface area ratio of 1.7 to 5,
        a contact angle with water of 150° or more,
        a contact angle with n-hexadecane of 80° or more, and
        a contact angle with water of 150° or more after being rubbed 100 times with a PET film under a load of 100 g.

3. The curable composition for forming a coating film according to claim 2, further comprising a fluorine-based solvent.

* * * * *